Oct. 19, 1954 A. C. DICKIESON ET AL 2,692,303

SPEECH INTERPOLATED COMMUNICATION SYSTEM

Filed Dec. 19, 1950 13 Sheets-Sheet 1

INVENTORS A. C. DICKIESON
P. G. EDWARDS
D. D. ROBERTSON
A. V. WURMSER

BY H A Burgess

ATTORNEY

INVENTORS A. C. DICKIESON
P. G. EDWARDS
D. D. ROBERTSON
A. V. WURMSER
BY H. A. Burgess
ATTORNEY INVENTORS A. C. DICKIESON
P. G. EDWARDS
D. D. ROBERTSON
A. V. WURMSER
BY H. A. Burgess
ATTORNEY INVENTORS A. C. DICKIESON
P. G. EDWARDS
D. D. ROBERTSON
A. V. WURMSER
BY H. A. Burgess
ATTORNEY INVENTORS A. C. DICKIESON
P. G. EDWARDS
D. D. ROBERTSON
A. V. WURMSER
BY H. A. Burgess
ATTORNEY

SPEECH INTERPOLATED COMMUNICATION SYSTEM

Filed Dec. 19, 1950 13 Sheets-Sheet 6

INVENTORS A. C. DICKIESON
P. G. EDWARDS
D. D. ROBERTSON
A. V. WURMSER
BY H. A. Burgess
ATTORNEY

SPEECH INTERPOLATED COMMUNICATION SYSTEM

Filed Dec. 19, 1950 13 Sheets-Sheet 7

INVENTORS A. C. DICKIESON
P. G. EDWARDS
D. D. ROBERTSON
A. V. WURMSER
BY H. A. Burgess
ATTORNEY INVENTORS A. C. DICKIESON
P. G. EDWARDS
D. D. ROBERTSON
A. V. WURMSER
BY H. A. Burgess
ATTORNEY

SPEECH INTERPOLATED COMMUNICATION SYSTEM

Filed Dec. 19, 1950 13 Sheets-Sheet 9

INVENTORS A. C. DICKIESON
P. G. EDWARDS
D. D. ROBERTSON
A. V. WURMSER
BY H. A. Burgess
ATTORNEY

SPEECH INTERPOLATED COMMUNICATION SYSTEM

Filed Dec. 19, 1950 13 Sheets-Sheet 10

INVENTORS A. C. DICKIESON
P. G. EDWARDS
D. D. ROBERTSON
A. V. WURMSER
BY H. A. Burgess
ATTORNEY INVENTORS A. C. DICKIESON
P. G. EDWARDS
D. D. ROBERTSON
A. V. WURMSER
BY H. A. Burgess
ATTORNEY Oct. 19, 1954 A. C. DICKIESON ET AL 2,692,303

SPEECH INTERPOLATED COMMUNICATION SYSTEM

Filed Dec. 19, 1950 13 Sheets-Sheet 12

INVENTORS A. C. DICKIESON
P. G. EDWARDS
D. D. ROBERTSON
A. V. WURMSER

BY H. A. Burgess

ATTORNEY

INVENTORS A. C. DICKIESON
P. G. EDWARDS
D. D. ROBERTSON
A. V. WURMSER
BY H. A. Burgess
ATTORNEY Patented Oct. 19, 1954 2,692,303

UNITED STATES PATENT OFFICE 2,692,303

SPEECH INTERPOLATED COMMUNICATION SYSTEM

Alton C. Dickieson, Mountain Lakes, Paul G. Edwards, Verona, Donald D. Robertson, Morristown, and Alphons V. Wurmser, Mount Bethel, N. J., assignors to Bell Telephone Laboratories, Incorporated, New York, N. Y., a corporation of New York Application December 19, 1950, Serial No. 201,586

23 Claims. (Cl. 179—15)

Figures 1, 14:
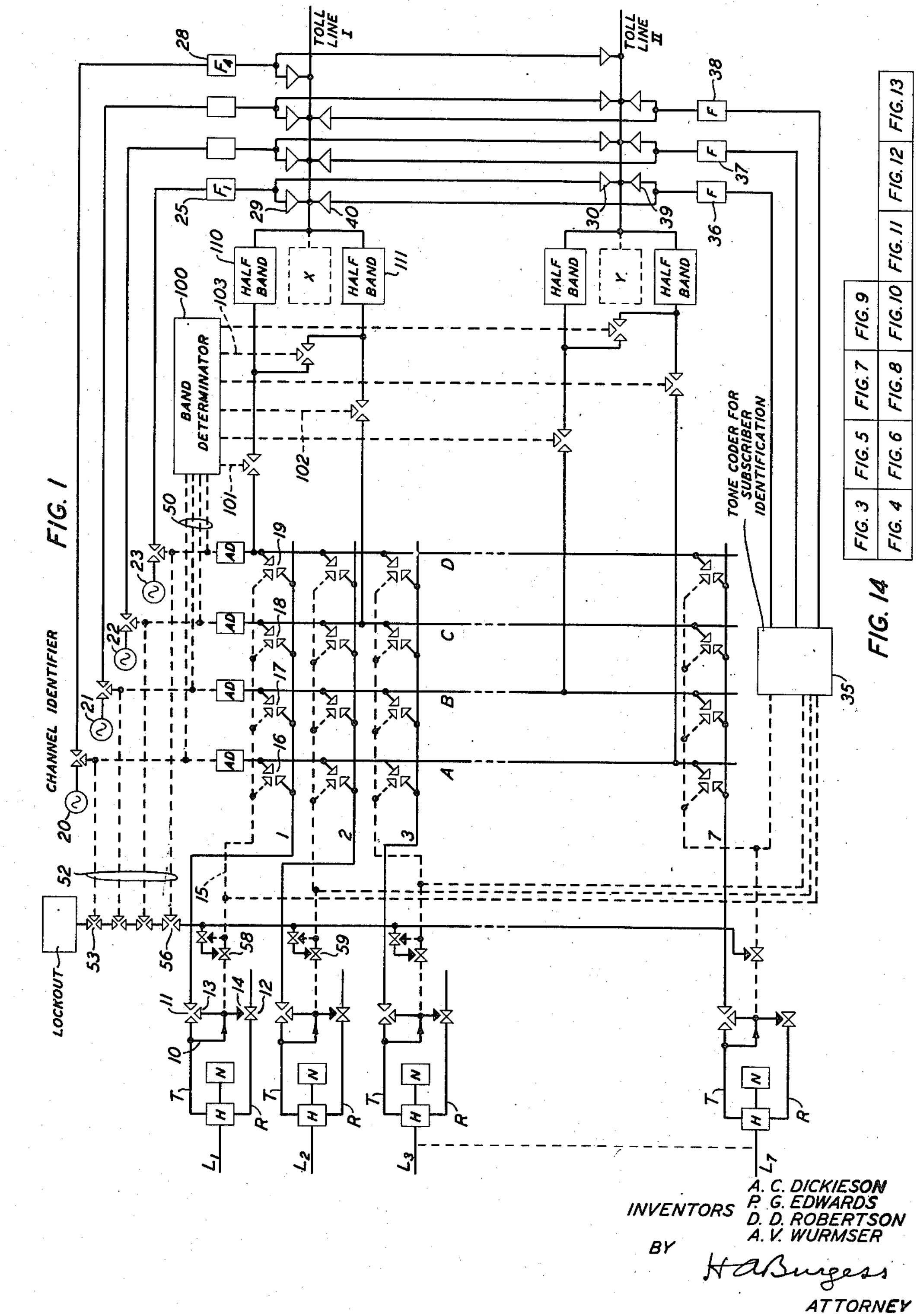

The present invention relates to interpolated speech transmission in which speech is transmitted in short fragments over available toll circuits with fragments from different talkers intermingled on the same circuits to make maximum use of the circuits by minimizing periods of no transmission during pauses between words or syllables of any one talker.

Systems of this general type heretofore proposed have provided for assignment of a given toll circuit to each talker in a given sequence or in preferential order or have employed at opposite ends of the trunk circuits subscriber-identifying devices operating in sequential order or dependent upon synchronous control or accurately timed relationship. Also in prior art systems the frequency band width allotted to any talker has remained unaffected by traffic demand. This has prevented greatest economy of available toll facilities under heavy traffic conditions, it being generally preferable to accommodate all talkers even at reduced quality of transmission than to shut out entirely a certain number of talkers who may be calling for circuits. In accordance with the present invention, all talkers up to the capacity that has been determined for the system have equal access to all toll circuits not in use, and any toll circuit becomes immediately available for instantaneous use by any other subscriber as soon as it is released by the previous talker. The connections of subscriber lines to the toll circuits are made for short periods comparable to syllable length or vocal interval duration. By way of example a vocal interval may vary from about a fifth of a second to about a twentieth of a second, these being approximate and depending somewhat upon the individual talker. Efficiency of use of the toll lines is increased by making the periods of connection short since a toll circuit is not held by a talker during pauses between syllables or word portions.

A feature of the invention is a provision whereby a given facility is used at full band width for transmission when all talkers at the time can be accommodated at full band, but as more talkers come on the system the band width allotted to a talker becomes narrower in order to provide a greater number of transmission paths (of lesser band width).

Another feature of the invention is a provision for switching at the two ends of the toll circuits such that certain equipment can be used in common by all subscriber lines and cross-talk is avoided while still giving all subscriber lines access to the toll circuits on an equal basis.

A general object of the invention is to increase the effectiveness of voice spurt transmission over toll circuits of less number than the subscribers' lines simultaneously served, by improving the availability of the toll circuits to the subscriber lines.

A further object is to increase the transmission effectiveness of the system by reducing the band width assigned to each talker as a function of the demand for circuits.

Figure 2:
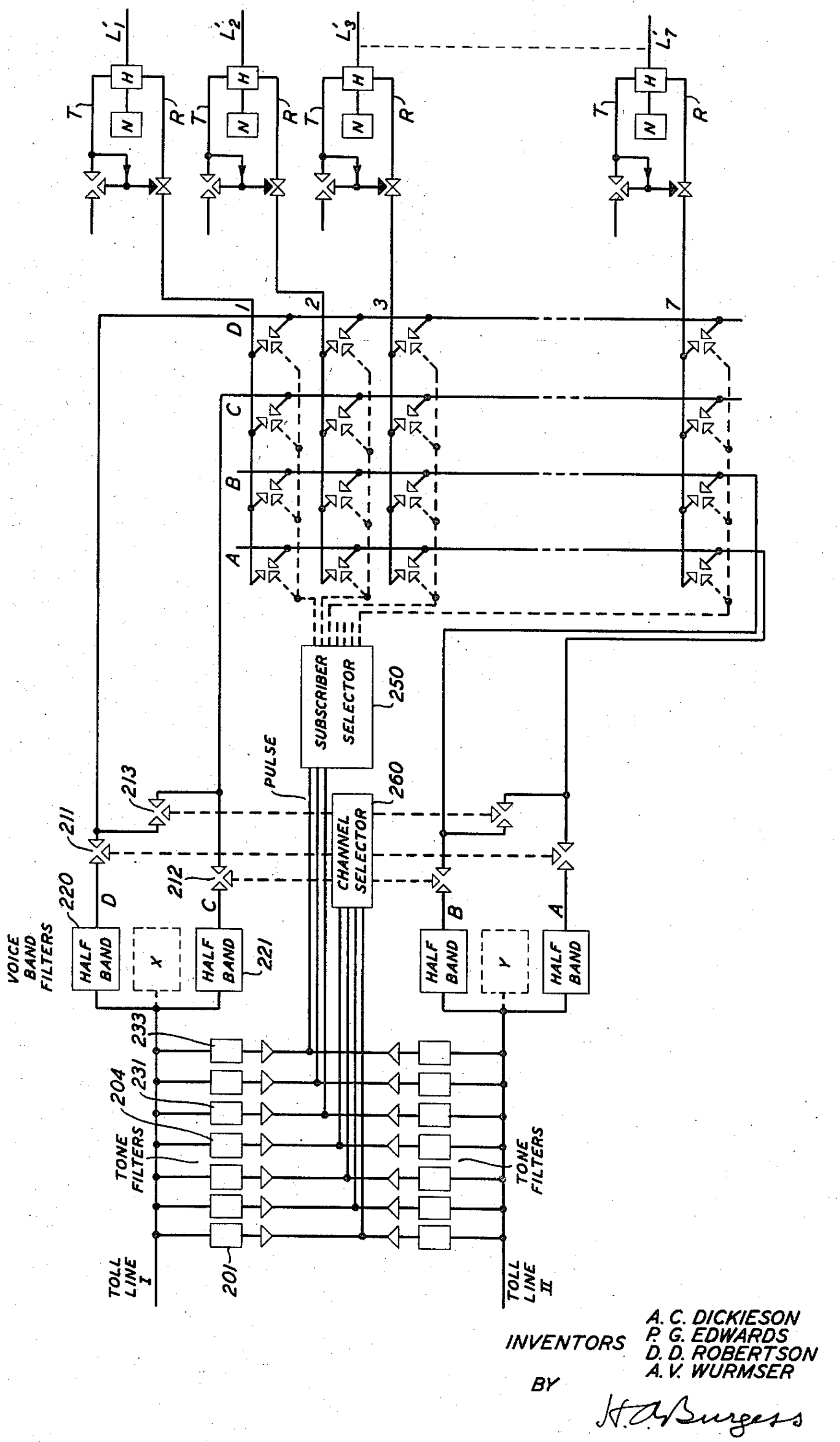

Other objects and features of the invention will appear from the following detailed description of a system embodying the invention, in connection with the accompanying drawing in which:

Figs. 1 and 2 together constitute a block schematic diagram of a transmitting station and a receiving system, to facilitate an understanding of the over-all operation; and Figs. 3 to 13 when placed together as indicated in Fig. 14 show in schematic circuit form a complete one-way system in accordance with the invention, it being understood that the circuit would be duplicated to provide the return side of a two-way system.

The over-all operation of a system according to the invention will first be described with reference to Figs. 1 and 2, Fig. 1 being assumed to be placed at the left of Fig. 2.

The seven subscribers' lines L1 to L7 shown at the left margin of Fig. 1 are to communicate with the seven subscribers' lines L1' to L7' shown at the right margin of Fig. 2 over the two toll lines, toll line I and toll line II, shown interconnecting the two stations.

Each toll line is assumed to be capable of transmitting a full speech band width, which may be taken by way of example as a band 3300 cycles wide located between 250 cycles and 3550 cycles, these figures being illustrative rather than limiting. The toll lines can, of course, be replaced with any other suitable transmission medium, such as two radio channels. In the modification diagrammed in Figs. 1 and 2, provision is shown for subdividing each of the full bands into two half bands so that if there are four simultaneous talkers, each talker has the use of half a full frequency band for the transmission of his speech. The maximum number of channels for simultaneous use is assumed to be four on the basis of a half band for each channel.

The rectangles X and Y indicate that the available band might be divided into thirds instead of halves. In the more detailed disclosure given later on, provision is made for so doing.

The seven subscribers' lines L1 to L7 compete with one another for finding one of the four possible channels that is momentarily not already in use by one of the lines. The various switches for associating a subscriber's line with a toll line operate very rapidly, for example, at a much faster than syllable rate so that the lines are seized and released for short intervals corresponding to spoken syllables and short pauses between the spoken syllables.

Each subscriber's line L1 to L7 is connected by means of the usual hybrid coil and balancing network to a four-wire circuit comprising a transmitting branch T and receiving branch R. The receiving branch is normally closed at a break point 12, while the transmitting branch is normally open at break point 11. A voice-operated control is indicated at 10 responsive to speech incoming from a talker on line L1 for opening the receiving branch at break point 12 and closing the transmitting branch at break point 11 for the duration of the speech syllable or spurt coming from the talker, such control being commonly referred to as an echo suppressor. (According to the usual convention, white arrow 13 indicates that when it is inserted between the break points 11, a conducting circuit is established through the break point, while the black arrow 14 when inserted between the points 12 breaks the conductive circuit at that point.)

The seven transmitting branches from the lines L1 to L7 are shown as crossing four vertical bus bars A, B, C, and D in the channel identifier, these four buses or channels corresponding to the four possible transmission channels over the toll lines I and II. At each of the cross points between the transmitter branches 1 to 7 and the buses A to D, provision is made for connecting a given transmitter branch to a given bus. This is indicated in the drawings by controls which are shown by broken line extending from the echo suppressor of each line to cross points in the lattice formed by the transmitter branches and the channel buses. The control line corresponding to line L1 is shown, for example, at 15. When a speech spurt is incoming on line L1, the control 15, in the absence of a lockout, closes one of the four connecting points 16, 17, 18 or 19. (Provision is made, as will be described later on in connection with the detail drawings, for making these circuit closures subject to an existing idle condition of a respective bus, this provision being omitted in the diagrammatic showing of Fig. 1.) Since each of the channel buses A, B, C, and D is connectible to a corresponding one of the four circuits utilizing the four possible transmission bands on the toll lines I and II, the speech spurt from any subscriber's line gaining access to the channel identifier matrix is transmitted to the corresponding line and channel, as will be more fully disclosed.

In order that any given speech spurt from one of the incoming lines shall find its way to the proper distant line L1' to L7', seven identifying tones are sent through the system, these tones being electrical waves having frequencies outside the ranges used for transmission of the speech. For example, they may be low frequencies below the lowermost band used for speech transmission or they may be located above the utilized speech band or partly below and partly above. Four of these tone frequencies are used to identify the particular channel A, B, C, or D over which a speech fragment is being transmitted, and these tones persist throughout the duration of the speech fragment. The other three tones are used singly or in various combinations to identify which of the seven subscribers' lines L1 to L7 is carrying the respective speech fragment.

The four channel-identifying tones are shown as coming from generators 20, 21, 22, and 23, any one of which is connected to an outgoing circuit whenever the corresponding channel bus A, B, C, or D has a speech fragment on it. The rectangles AD shown at the upper ends of the speech buses A, B, C, and D represent one way in which this may be done. These rectangles indicate amplifier detectors which convert the speech currents into suitable currents for exercising the controls over the switches for the channel-identifying tones. These tones are sent through respective filters 25 to 28 and amplifiers 29, 30, etc. into each of the toll lines I and II.

The tones for identifying the separate subscriber lines are generated in the mechanism indicated at 35. Each of the voice operated controls in addition to the controls already described, sends a control over one of the dotted lines into the tone coder 35, where provision is made for sending out the three tones singly or in various combinations to provide seven different identifications. These tones are sent in short pulses at the beginning of the speech fragment, and, as already stated, unlike the four tones used for channel identification, they do not persist throughout the entire speech fragment. These tones are sent through the filters 36, 37, and 38 and amplifiers 39, 40, etc., to the toll lines I and II.

A band determinator 100 is provided for determining whether any portion of speech being transmitted is to occupy a half band or a full band. If only a single speech fragment is to be transmitted at a particular instant over toll line I, it is allowed to occupy the entire speech band. The same is true as regards toll line II. If two speech fragments from two different talkers are to be transmitted at the same instant over either line, the band determinator allows each speech fragment to occupy only half the available band. For this purpose, four controls indicated at 50 extend from the respective buses A, B, C, and D into the band determinator 100. In the manner to be described in the specific disclosure, these determine how the controls extending from the bottom of the determinator 100 are actuated. Assuming first that speech fragments exist on both buses C and D, control 101 allows the speech spurt on channel bus D to be transmitted through the half band circuit 110 to the toll line I, and control 102 allows the speech fragment on bus conductor C to be transmitted through half band circuit 111 to toll line I. If there is a speech fragment on either bus conductor C or D but not on both, a control 103 is actuated along with either the control 101 or 102 to allow such fragment to be sent through both half band circuits 110 and 111, to provide a full band circuit, to the toll line I. A similar arrangement is provided with respect to channel buses A and B and toll line II.

It is thus seen that any number of simultaneous talkers up to and including four may gain access to the toll lines I and II by means of the controls that have been described. If at the same time a fifth talker tries to obtain access to the circuit, he will be locked out until a circuit is released by one of the four talkers assumed. The lockout provision is indicated by the controls 52 extending from the channel buses A, B, C, and D to the control points 53 to 56. When all of these are closed together, a lockout is produced by control of the switch points 58, 59, etc., in those controls extending from the echo suppressors of the respective seven subscribers' lines which are not already energized.

Referring to Fig. 2, the channel-selecting tones are derived through the filters 201 to 204 and pass into the channel-selecting apparatus 260. Controls are shown extending from the channel-selecting equipment 260 for closing break points in the receiving branches of toll line I at 211, 212, 213, and for closing corresponding break points in the receiving branches from toll line II. These operate in similar manner to those described in connection with the band determinator 100 of Fig. 1 to allow received speech currents to pass through either of the half band circuits 220, 221 or through two of such half band circuits together to provide full band transmission. It will be understood that the channel selector 260 is properly coordinated with the band determinator 100 of Fig. 1 under control of the channel-identifying tones to direct a received speech fragment from either toll line I or II into the proper channel A, B, C, or D corresponding to the channel on which the speech fragment was impressed at the transmitting station.

A lattice comprising the channel buses A, B, C and D and receiving branches for the seven lines L1′ to L7′ is shown in Fig. 2. It has been shown how received speech fragments are impressed on these respective channel buses in the proper order. It remains to be shown how a given speech syllable or fragment finds its way into the particular subscriber's line L1′ to L7′ for which it was intended.

The subscriber-identifying tones are derived from lines I and II by way of the filters 231 to 233 and are sent into the subscriber-selector mechanism 250. As already described, these tones are received in short pulses. By analyzing the three tones sent into the subscriber selector 250, seven different indications are obtained on the seven controls shown extending to the right from box 250. Each of these seven controls selectively operates one of four closure points provided between the corresponding subscriber's line L1′, etc., and the four buses A, B, C and D. Provisions to be described fully in the more detailed description but not shown in Fig. 2 are made for preventing seizure of more than the one desired subscriber line in response to a combination of channel-selecting tone and subscriber-selecting tones.

Reference will now be made to the detail circuit shown on Figs. 3 to 13, inclusive, and first to the transmitter circuit shown on Figs. 3 to 8, inclusive.

Figure 3:
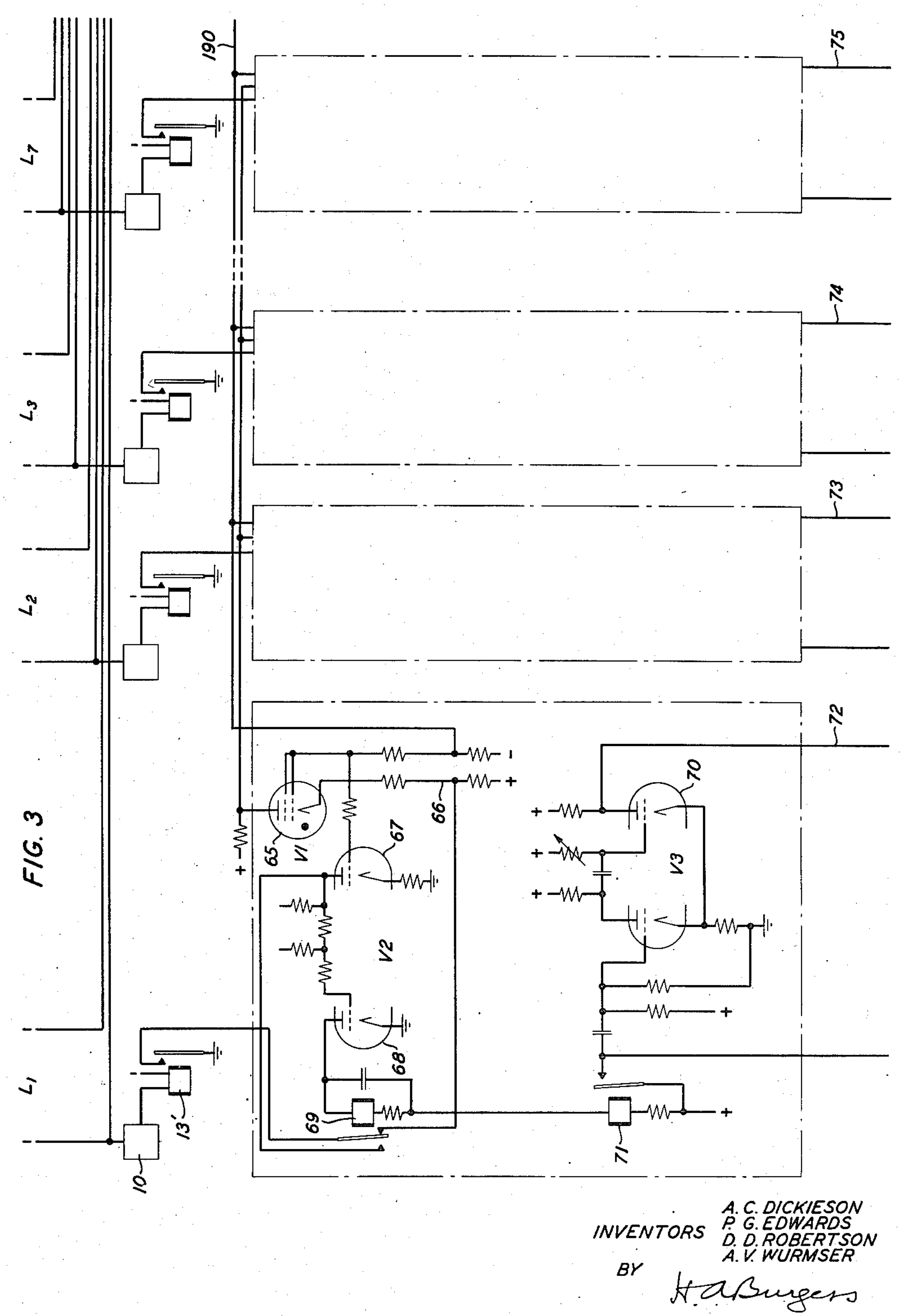

The seven subscriber lines are indicated at the top of Fig. 3 and each is shown provided with a relay 13′ which is part of the vodas (or echo suppressor) circuit and may be the vodas relay itself or a relay operated with the vodas relay. This relay responds to voice spurts and remains operated throughout a voice spurt which may be assumed to be of syllable duration of the order of one-tenth to one-twentieth of a second for illustration.

Below the relays 13′ is an access circuit comprising a bank of gas-filled tubes 65, one per subscriber line. Whenever a relay 13′ operates it causes the corresponding tube 65 to fire. This firing of any tube 65 prevents any other tube 65 from firing for a brief interval such as a hundredth of a second. A subscriber-identifying tone is sent out under control of a tube 70, one per subscriber line, and at the same time selection is made of an idle one of the four circuits A, B, C, D, (Fig. 4) by firing, in the case of subscriber line L1, one of the four gas-filled tubes 76, 77, 78 or 79. Each of these last tubes is one of a row of seven, there being therefore four rows. The firing of any tube in a row renders inoperable the other gas-filled tubes of the same row and so prevents seizure of a given channel by more than one subscriber at the same time.

The details of the foregoing operation follow. When a relay 13′ pulls up, it applies ground at a point in the cathode circuit of tube 65 lowering the potential of the cathode sufficiently to permit the tube to fire, there being plate voltage on the plate of the tube at all times except when another gas tube in the row is conducting. Breakdown of tube 65 results in making its grids positive causing triode 67 to saturate and cutting off triode 68 which releases normally energized relays 69 and 71. Relay 69 in releasing deionizes tube 65, making the other tubes 65 of the access circuit usable by other lines, and maintains triode 68 cut off under control of ground from operated relay 13′. At the end of the voice spurt relay 13′ releases restoring the whole circuit to normal.

Relay 71 in releasing as described initiates operation of single-trip multivibrator 70 which executes one cycle resulting in application of a pulse, about a hundredth of a second long, to lead 72 extending to the tone coder 35 (Fig. 8) for subscriber identification.

When a gas-filled tube such as tube 76 fires, on release of relay 71 as described, current is drawn through cathode resistor 81 raising the potential of conductors 82 and 83. Lead 83 forms part of the cathode-to-ground connection of each of the other tubes 84, etc., of the A row, and each tube has its own cathode resistor 85. The firing of any gas tube in the row A, including tubes 76, 84, etc., raises the potential of the cathodes of all the other tubes in the row sufficiently to prevent them from firing in response to a voice spurt on any subscriber line. Lead 82 applies positive voltage to the grid of tube 115 at the cross-point between the talking conductors of line L1 and channel A of the switching matrix of Fig. 6. This results in actuation of relay 16 which extends the voice path coming from the transmitting branch of line L1 through speech transformer 116 to the channel A conductor 120.

It will be noted that the interlock between the gas-filled tubes 65 of the access circuit prevents simultaneously occurring speech spurts on two subscriber lines from initiating channel selecting and switching operations at the same instant. Depending upon which tube 65 fires first, the corresponding tone sender tube 70 and channel seizing tube 76, 77, etc., operate to effect switching for one of the lines and a short interval of about a hundredth of a second must elapse before the speech spurt assumed to be present on the second line can initiate the switching operation for that line. This interval is fixed by the timing that is assigned to the relays and control circuits of tubes 67, 68 and 70 of each line.

If all four channel-selecting circuits A, B, C and D (Fig. 4) are idle when a speech spurt begins on any line, the channel that is selected depends upon which one of the four tubes 76, 77, 78 or 79 (in the column belonging to the line) fires first. One and one only of the tubes will fire and in firing will drop the plate voltage of the others below the ignition level by current flow through the common plate resistor 87. Each row of tubes 76, etc., has a busy signal tube 88 associated with its cathode resistor to maintain the row (such as A) busy for about one-hundredth second after the re-energization of relay 71 at the end of a speech spurt. The charge on condenser 89′ keeps the grid positive until the charge leaks below a critical value, and so maintains point 81′ positive. Another speech spurt beginning during this brief hold-over period is caused to select another row, assuming there is one idle. If only one talker is active this short hold-over causes his line to rotate around the four channels thus giving some privacy. The time constant of the circuit is determined by resistance 89 and condenser 89'.

Referring to the subscriber tone coder 35 (Fig. 8) this comprises twelve tubes, parts only of which are shown at 122, 124, etc. The upper three tubes have their grids connected to the first three leads 72, 73, 74. The next three leads from lines L4, L5, L6 (not shown), each connect to the grids of a pair of tubes (not shown) while the last lead 75 connects to three tubes 124. Each relay 125, 126, 127 is connected to four anodes, the anode of one of the upper three tubes, the anode of one of the lowest three tubes and the anode of one of each of two different pairs. This results in operating the relays 125, 126 and 127 either singly or in various combinations to provide the seven different identifications necessary for the seven subscriber lines.

When relay 125 operates it substitutes timing elements 132 for timing elements 131 of oscillator 130 to change its output from spacing to marking frequency. The other two oscillators are similarly controlled. These identifying signals are, as stated, in the form of short pulses occurring at the beginning of each speech spurt that is to be transmitted. Due to the interlock above described in the switch initiating circuits no two identifying tone combinations can be sent at the same time or in overlapping times but must be separated in time by about a hundredth of a second.

Figure 5:
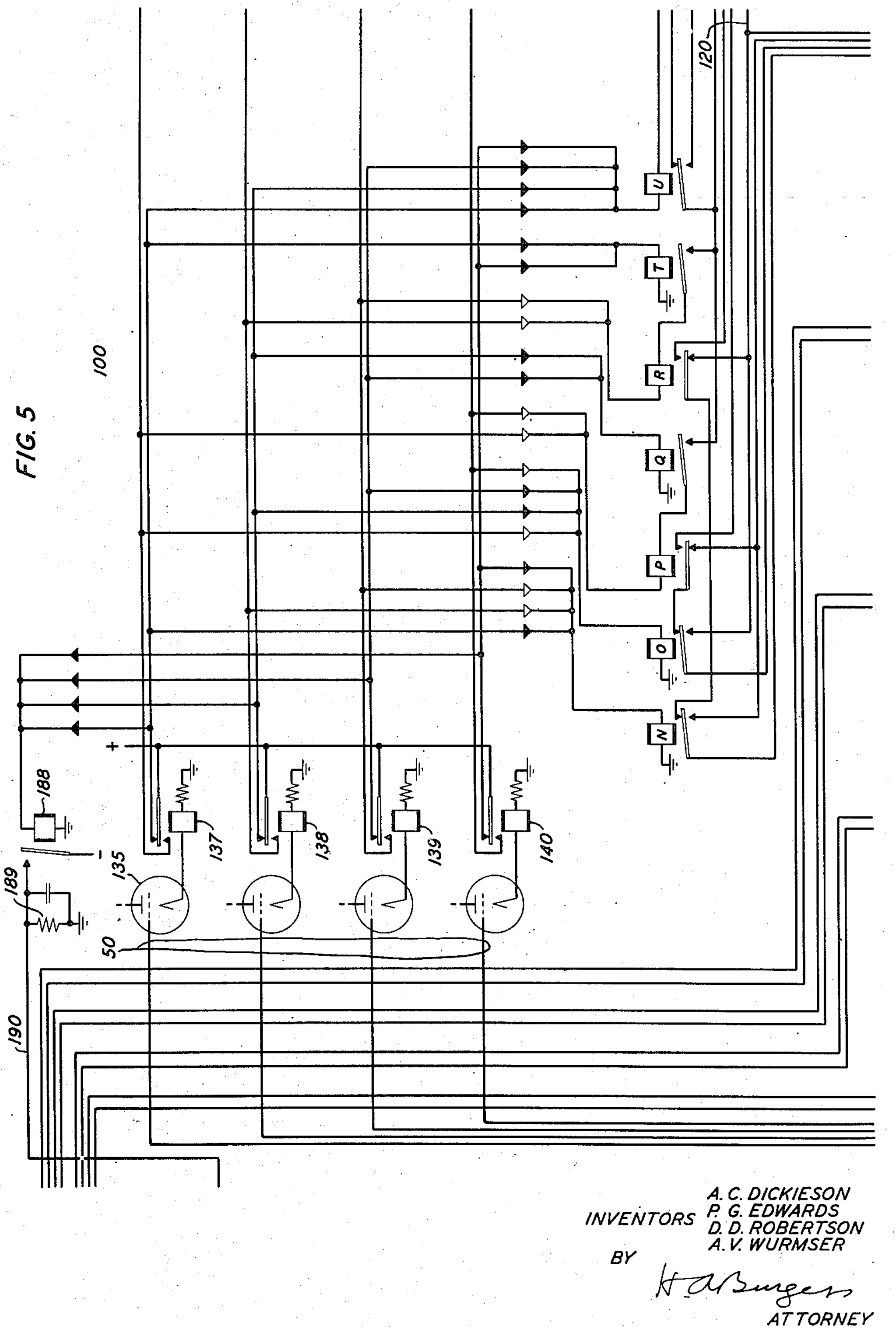
Figure 7:
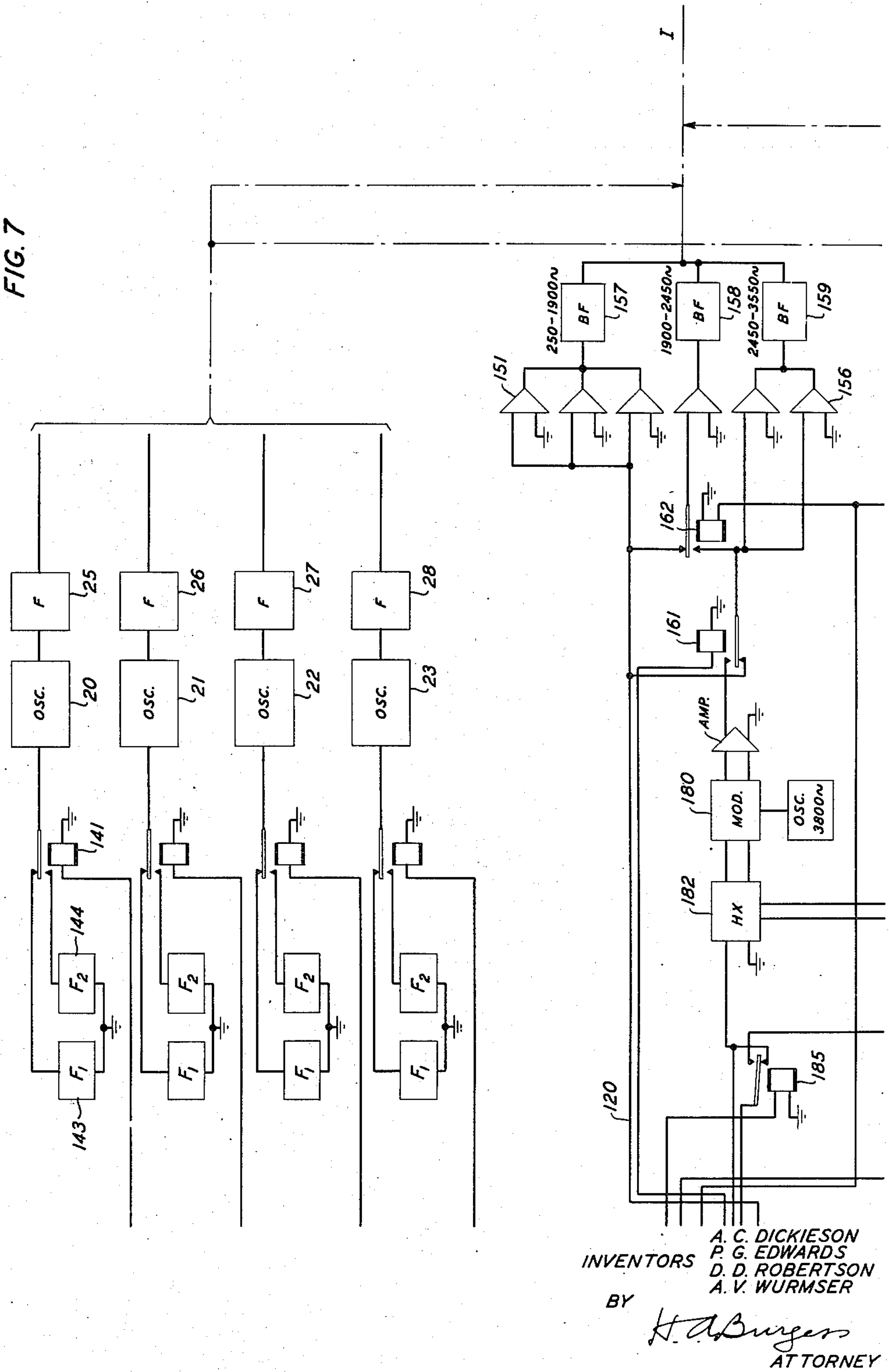
Figure 8:
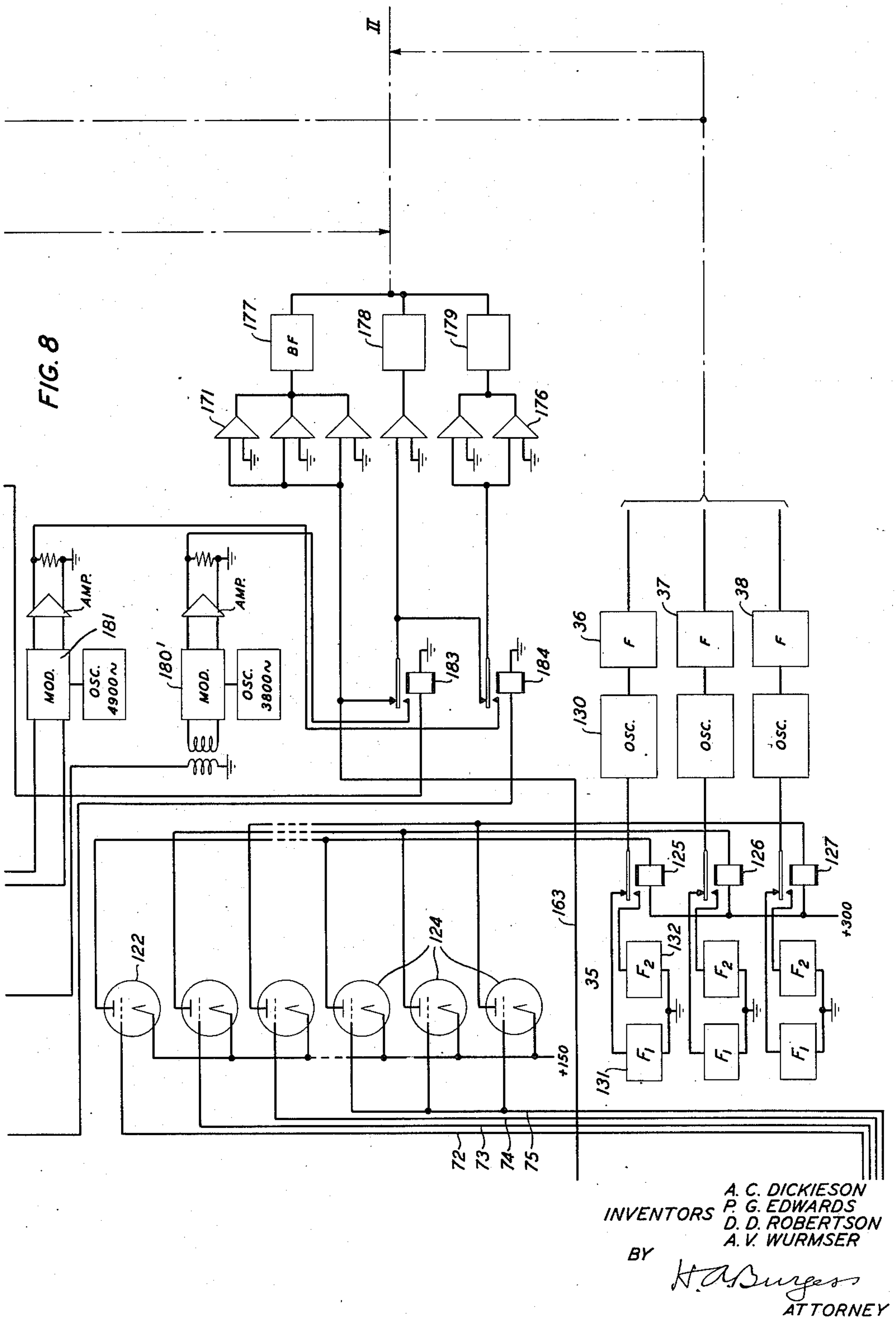
Figure 9:
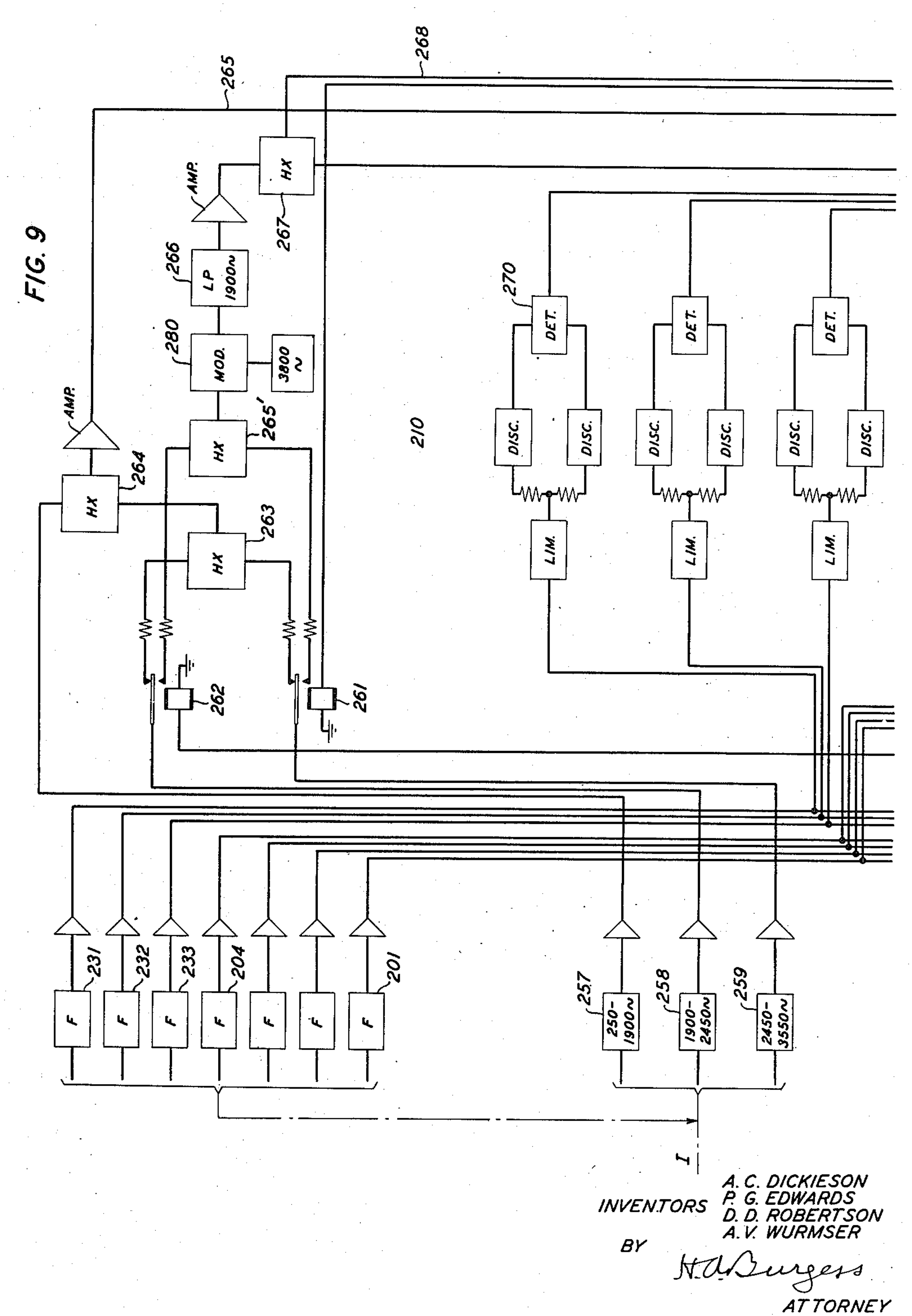
Figure 10:
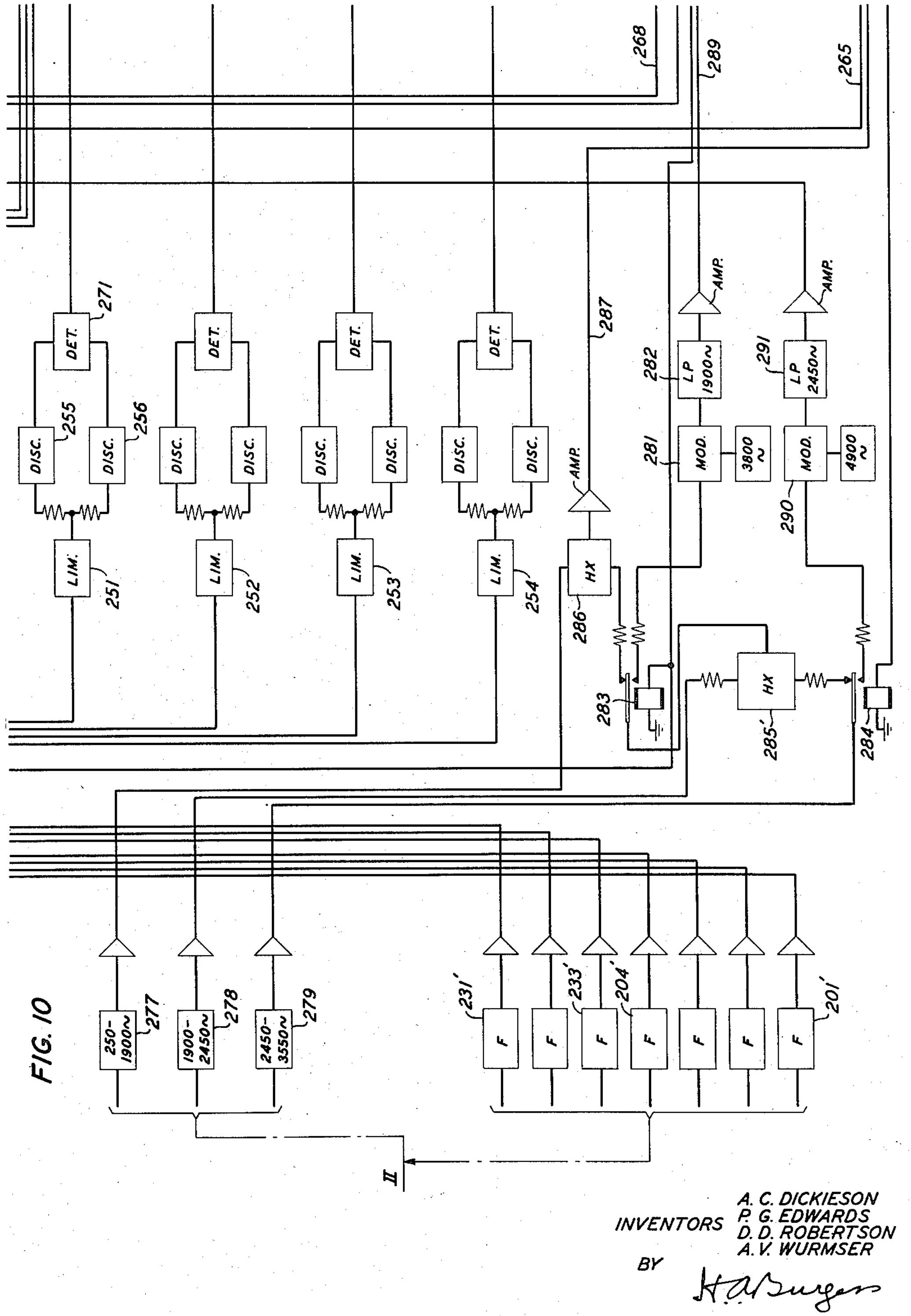
Figure 11:
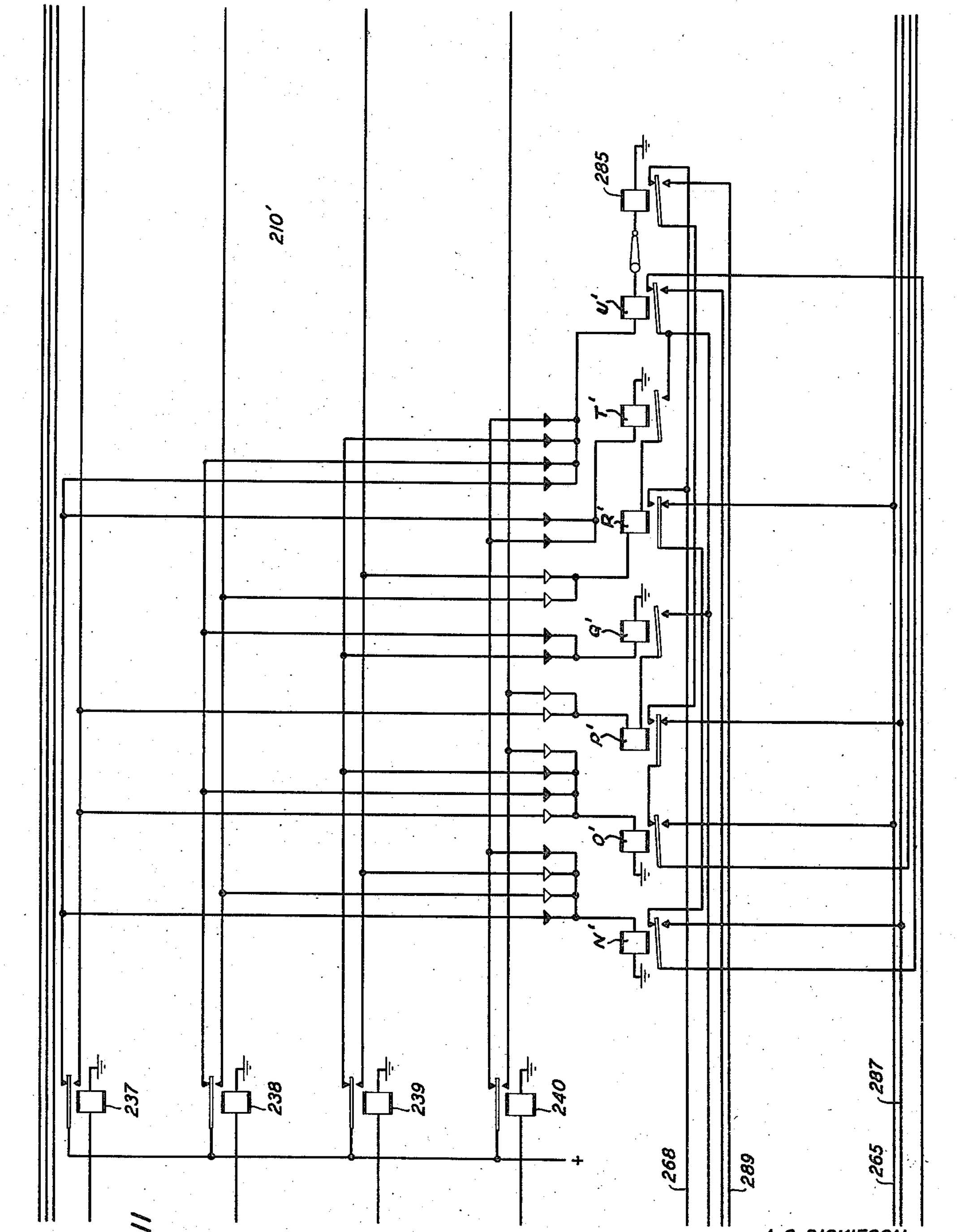

Reference will now be made to the channel identifier 100 (Fig. 5). The four control conductors 50 lead to the grids of tubes 135 etc., from the cathode resistors 81 of respective A, B, C, and D rows, one conductor being 83 leading to the grid of tube 135. Whenever any tube 76, 84, etc. in row A fires and places positive voltage on lead 83, tube 135 causes relay 137 to operate. Relays 138, 139 and 140 are similarly operated from tubes 77, 78, 79 respectively or from other tubes in the respective rows. It is the function of relays 137 to 140, inclusive, to control the band width used for transmission and to send a channel-identifying tone to the distant station. The tones are controlled by relays 141 etc., which operate from front contacts of relays 137 etc., to shift the tuning of oscillators 20 etc., from normal or spacing frequency $F_1$ to marking frequency $F_2$ by exchanging timing controls 143 and 144 (Fig. 7).

The band width is controlled by relays N, O, P, Q, R, T, and U whose windings are connected through varistors to contacts of relays 137 to 140, inclusive. Certain of the varistors are shown white and the others black in the drawing, for ease in reading the circuit. The varistors prevent voltage back-up into the multipled leads. The white indicates that in the idle condition of the circuit as shown, no current is being passed through these varistors. Black indicates that current is passing. Current through one of the varistors is sufficient to operate a relay.

With the determinator 100 in the condition shown on the drawing, if a speech spurt is placed on channel A from any subscriber line it will pass over conductor 120 (Fig. 6) in part through rest contacts of relays 161 and 162 to the inputs of the six amplifiers 151 to 156, inclusive, the outputs of which may be combined and lead through band pass filters 157, 158 and 159 as shown, passing respectively different parts of the speech band amounting together to the entire speech band, to line I.

If the speech spurt had been placed on channel B instead of on channel A it would have been led over conductor 163 and in part over the rest contacts of relays 183 and 184 to the inputs of the six amplifiers 171 to 176, inclusive, and band filters 177, 178 and 179 to line II. If the speech spurt had been placed on channel C instead, it would be routed over the channel B output conductor 163 by way of contacts of relays O and P. If the spurt had been placed instead on channel D it would have been routed over the channel A output conductor 120 over front contact of relay N and back contact of relay R. In each of these four assumed cases, the speech spurt would be transmitted with full band.

The circuit provisions are such that when only three talkers are transmitting at the same instant each talker is assigned two-thirds of the full band and when four talkers are transmitting each is assigned half a band. The two-thirds band is assigned by permitting one talker to use filters 157 and 158, the second talker to use filters 177 and 178 and the third talker to use filters 159 and 179. In the case of the third talker it is necessary to shift his speech frequencies in the 250 to 1350 range up to the range between 2450 and 3550 in order to allow them to pass through filters 159 and to shift his speech frequencies in the 1350 to 2450 range up to the range between 2450 and 3550 in another circuit so as to allow them to pass through the other filter 179. The former shift is made by modulating the 250- to 1350-cycle band by a 3800-cycle wave in modulator 180 while the latter shift is made by modulating the 1350- to 2450-cycle band by a 4900-cycle wave in modulator 181. The one speech fragment is divided into two parts and passed into these two frequency-shifting circuits at the hybrid coil 182. For this operation relays 161 and 184 are energized and relays 162 and 183 are released.

For the four-talker condition the first talker in the case of each toll line I and II uses only the filter 157 or 177 respectively. The second talker in each case has his 250- to 1900-band shifted upward to the 1900 to 3550 range by modulation with a 3800 cycle wave in respective modulator 180 or 180'. For these operations, relays 161 and 162 are both energized allowing the second talker on line I to use modulator 180 and filters 158 and 159, and relay 185 is released while relay 183 is energized allowing the second talker on line II to use modulator 180' and filters 178 and 179.

The condition (operated or released) of the relays in the band discriminator 100 that are necessary to produce the above-described circuit conditions for the full-band, half-band or two-thirds band transmission are given in the following table:

| Channel Connection Made by Subscriber | Relay in Band Determinator Circuit O=Operated R=Released | | | | | | | Lock-Out Relay 188 | Relays Operated in Band Connecting Circuit |
|---|---|---|---|---|---|---|---|---|---|
| | N | O | P | Q | R | T | U | | |
| Ch. 1 | O | O | R | O | R | O | O | O | 185 |
| Ch. 1 and 2 | O | O | R | O | R | O | O | O | 185 |
| Ch. 1, 2 and 3 | O | O | O | R | R | O | O | O | 161, 184, 185 |
| Ch. 1, 2, 3 and 4 | O | O | O | R | O | R | R | R | 161, 162, 183 |
| Ch. 1 and 4 | R | O | R | O | R | R | O | O | 185 |
| Ch. 2 and 3 | O | R | R | R | R | O | O | O | 185 |
| Ch. 3 and 4 | O | O | R | O | R | O | O | O | 185 |
| Ch. 2 | O | O | R | O | R | O | O | O | 185 |
| Ch. 3 | O | O | R | O | R | O | O | O | 185 |
| Ch. 4 | O | O | R | O | R | O | O | O | 185 |

The lockout relay 188 is energized from the back contacts of relays 137 to 140 in parallel. When all of these relays are operated no energizing path exists for relay 188 and it releases and applies negative voltage to conductor 190 extending to the grid circuits of all of the seven gas tubes 65 etc., thus preventing any of these tubes from firing in response to a speech fragment incoming from any line L1 to L7 inclusive, that may be seeking a channel. As soon as one of the four talkers using the four channels releases a channel the corresponding relay 137 to 140, inclusive, releases and energizes lockout relay 188 to interrupt the lockout condition at its back contact. Circuit 189 allows about a hundredth of a second hangover in this interruption.

Referring now to the receiving terminal shown on Figs. 9 to 13, inclusive, the separating filters 257, 258, 259, and 277, 278 and 279 correspond to filters 157, 158 and 159 and 177, 178 and 179 of the transmitter.

The channel-selecting tones from the four pairs of filters 201—204 and 201′—204′ are led through limiters 251, 252, 253 and 254 to discriminator circuits and detectors. Each limiter such as 251 is followed by a pair of discriminator branches 255, 256 leading to differential detector 271 which converts the marking and spacing frequencies on its channel into current and no-current signals for operating the corresponding relay 237 in the determinator 210. The relays 237 to 240, inclusive (corresponding to relays 137 to 140, inclusive, at the transmitter), operate relays N′ to U′, inclusive, and relay 285 of the determinator 210, in the same general manner as described in connection with determinator 100.

Figure 12:
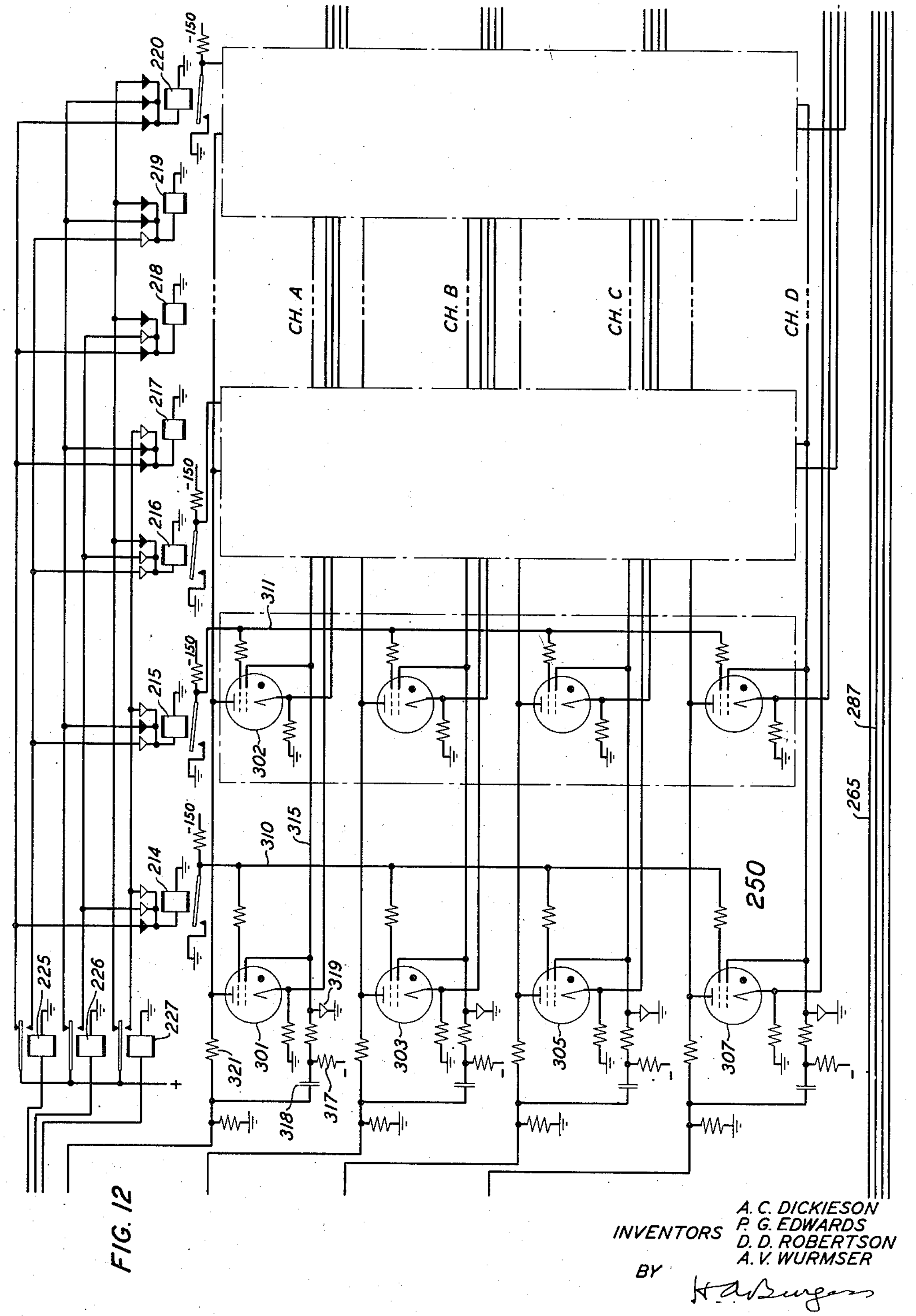

The subscriber-selecting tones are received through filters 231 to 233, inclusive and 231′ to 233′, inclusive, and are passed through limiter and detector circuits 270 etc., for controlling the three relays 225 to 227, inclusive (Fig. 12). These respond singly or in various combinations to actuate selectively the seven relays 214 to 220, inclusive, of the subscriber-selector circuit 250, Fig. 12. Relays 214 to 220 are all normally energized and selection of a subscriber is made by releasing the corresponding relay, thus connecting ground at its back contact to the outer grids of the thyratrons in the corresponding vertical column in place of the normal negative bias. Relay 214 is normally energized from the back contact of relay 225 and will be released when relay 225 is energized provided neither relay 226 nor 227 is also energized. Relay 215 is released by energization of relay 226 only, etc. Release of relay 216, 217 or 218 requires energization of a pair of relays 225–227, while all three relays must energize in order to release relay 220. In this manner the seven selections are made by use of three relays 225–227 controlled by three tones.

If a full band is received on line I representing one speech transmission, relays 261 and 262 (Fig. 9) are released, as determined by channel selector 210 (to be described) and the component bands from all three filters are combined in hybrids 263 and 264, and the full band is impressed on conductor 265 which leads to channel A.

Similarly, full band reception on line II finds relays 283 and 284 released and the bands are routed through hybrids 285′ and 286 to conductor 287 which leads to channel B.

In the succeeding description, reference may be made to the table above to determine the circuit condition of the relays, receiving relays 261, 262, 283, 284 and 285 corresponding to transmitting relays 181, 182, 183, 184 and 185, as given in the table For half band reception on line I, relays 261 and 262 are operated to connect filters 258 and 259 through combining hybrid 265′ to the input of modulator 280 where the 1900- to 3550-cycle band is stepped down to the 250- to 1900-cycle range which is transmitted through filter 266 and hybrid 267 to conductor 268 leading to the channel determinator where the conductor extends via front contact of relay R′ (now operated) and front contact of relay N′ (also operated) to channel D and thence to the subscriber connector circuit to be described. Conductor 265 is used as before but now carries only the half band received through filter 257.

Similar action takes place in the receiving terminal for line II, the half band from filter 277 passing over lead 287 to channel B bus and the other half band received through filters 278 and 279 combining in hybrid 285′ (relay 284 released) and passing through front contact of relay 283 to the input of modulator 281 and filter 282, emerging as a half band in the range 250 to 1900 cycles on conductor 289 which leads through back contact of relay 285 (now released) front contact of relays O′ and P′ (now operated) to channel C bus.

For two-thirds band operation, the outputs of filters 257 and 258 are combined at hybrid 264 to pass into channel A, while the outputs of filters 277 and 278 are combined at hybrid 286 to pass into channel B. The output from filter 259 is stepped down in frequency by modulator 280, while the output from filter 279 is stepped down in frequency in modulator 290, passed through filter 291, and combined in hybrid 267 with the output from filter 266 to pass into channel C.

When any speech spurt is received over line I or line II, the subscriber tone pulse received with it selects one of the seven relays 214 to 220 (Fig. 12) and releases it. Also, the channel tone received with the speech spurt operates one of the channel selecting relays 237 to 240 in determinator 210′. When one of the latter relays operates, it applies plate voltage to seven thyratrons in the corresponding row, such as 301, 302, etc., of the channel A row. This alone will not cause any thyratron to fire, however, since the shield grids of all thyratrons are normally held too far negative to fire, by battery applied over vertical conductors 310, 311, etc. This negative voltage is removed from any vertical column of thyratrons by selections (release) of a subscriber tone relay 214, 215, etc. When this disabling voltage is removed and plate voltage is applied, only that thyratron at the cross-point of the marked channel and subscriber buses will respond, this being the selected thyratron. The initiation of the plate voltage produces a momentary positive pulse which nullifies the negative voltage applied to the inner grid over conductor 315 (considering channel A) from bias source 317, this pulse coming from flow of surge current through condenser 318 and through varistor 319 in its forward direction. This causes the selected thyratron to fire and drop the plate voltage on those of the same channel by current through common resistor such as 321.

Figure 13:
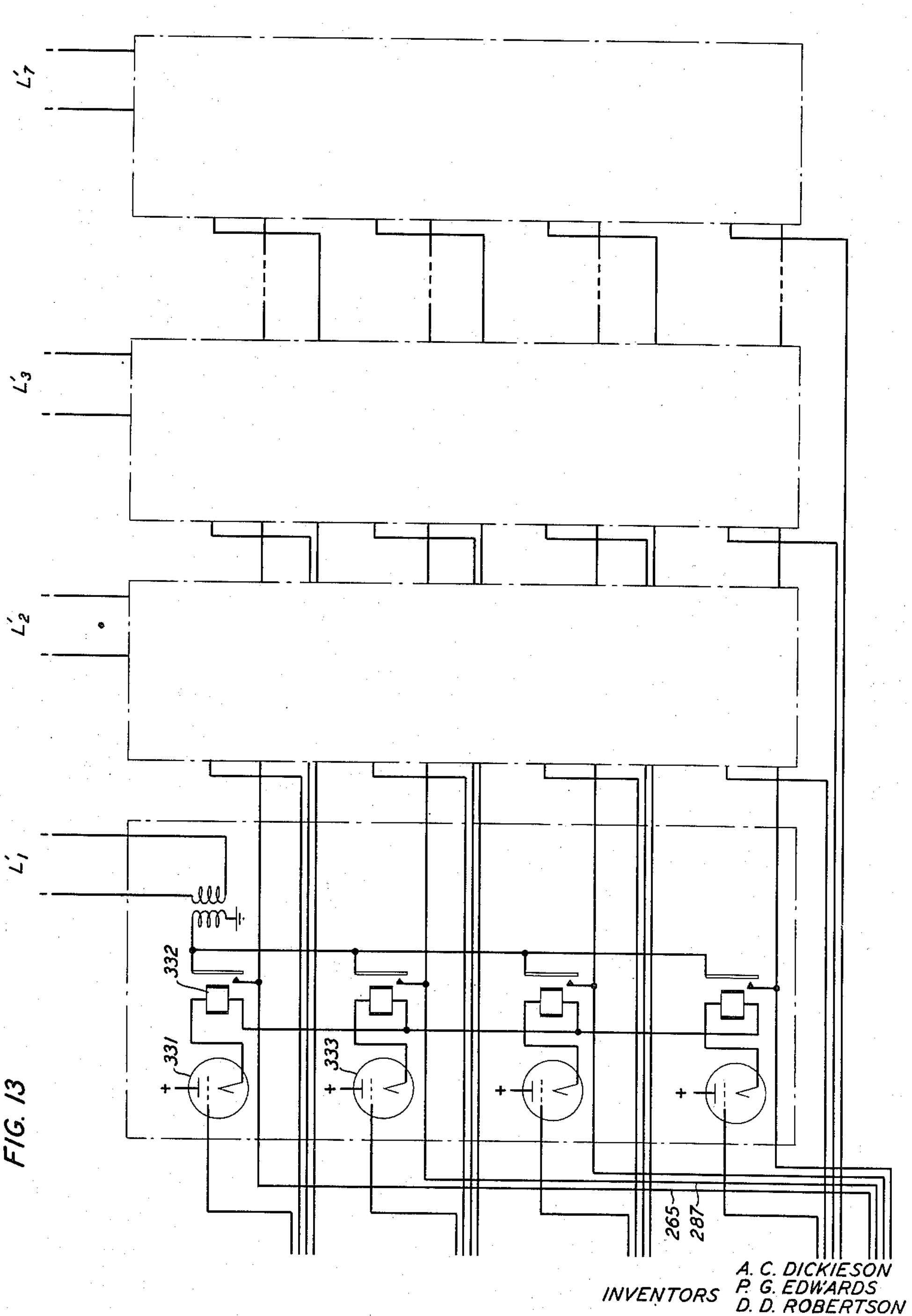

Each of the seven gas tubes in a channel row has an individual lead extending from its cathode to the control grid of a triode 331 etc. in the corresponding row of the subscriber connector (Fig. 13). The firing of one of the thyratrons puts a positive pulse on the grid of the respective triode causing relay such as 332 to energize and connect the speech lead of that channel to the corresponding subscriber line L'1 to L'7.

Any thyratron 301 etc. in the subscriber selector when once fired remains ionized until its plate voltage is removed, notwithstanding that relays 213 to 220 release, when selected, for only about a hundredth of a second and, upon again energizing, reapply negative voltage to the shield grids of the tubes in the respective column. As long as the channel tone persists, holding one of relays 237–240 operated, the one operated thyratron in the subscriber selector holds the subscriber connecting tube and relay (such as 331 and 332) actuated to maintain the connection. Upon release of the relay in the group 237–240, the circuit is restored.

Since each subscriber selecting relay 225–227 releases as soon as a connection to the desired subscriber is made, these relays become available for use by other subscribers in making calls.

Instead of connecting filters 157, 158, 159, 177 etc. at the transmitter directly to the transmission trunk circuits I and II, they may, and in case of transatlantic radio channels generally would, be connected to privacy equipment, one type being by way of example that shown in A. C. Dickieson, Patent 2,407,260, issued September 10, 1946. Any other suitable privacy system could be used, however. At the receiver, similar privacy equipment would be inserted ahead of filters 257, 258, etc. The continual switching from one condition to another incidental to the transmission of speech spurts as disclosed adds to the amount of privacy obtainable when using privacy equipment in the manner mentioned.

Figure 4:
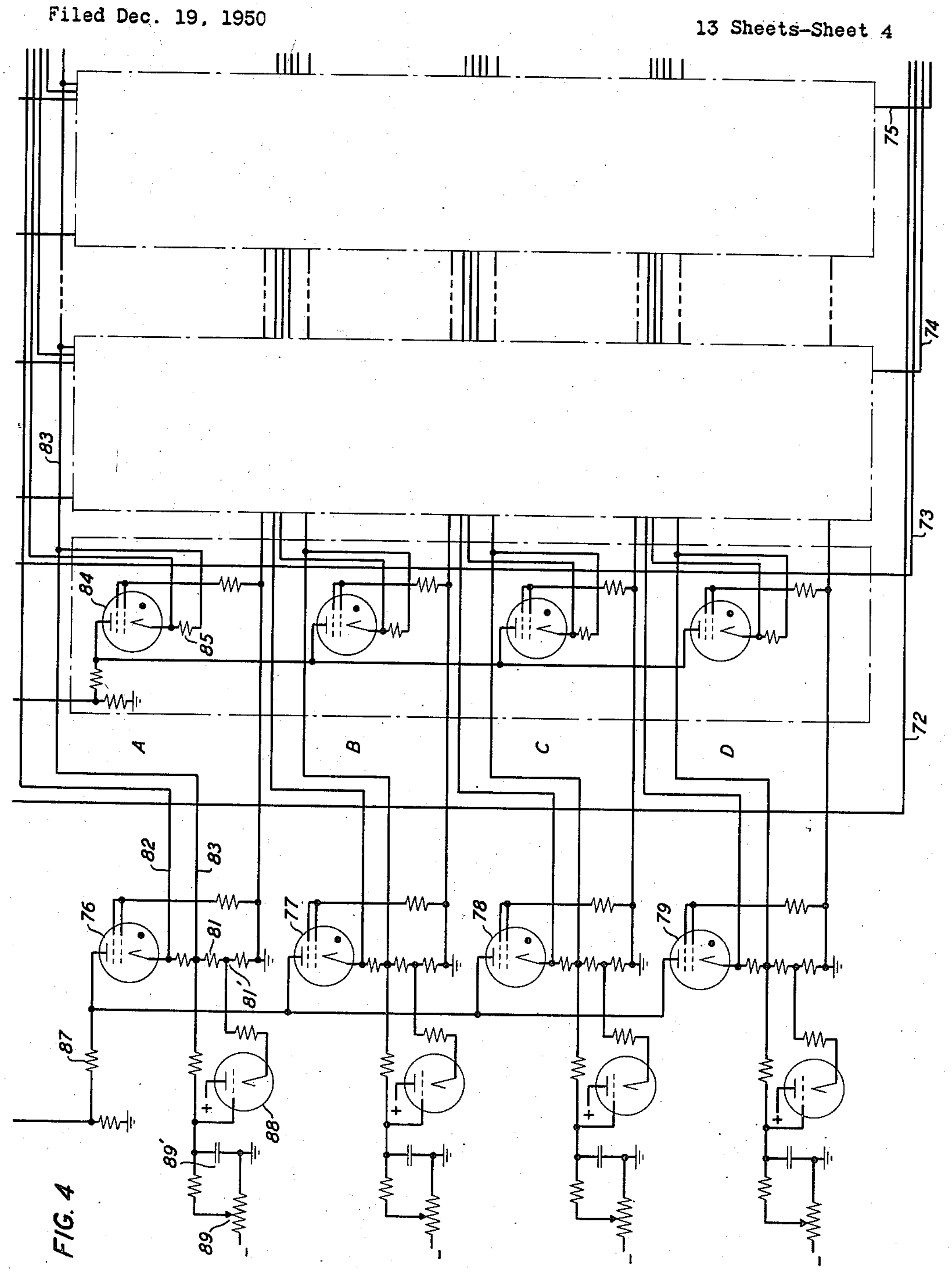
Figure 6:
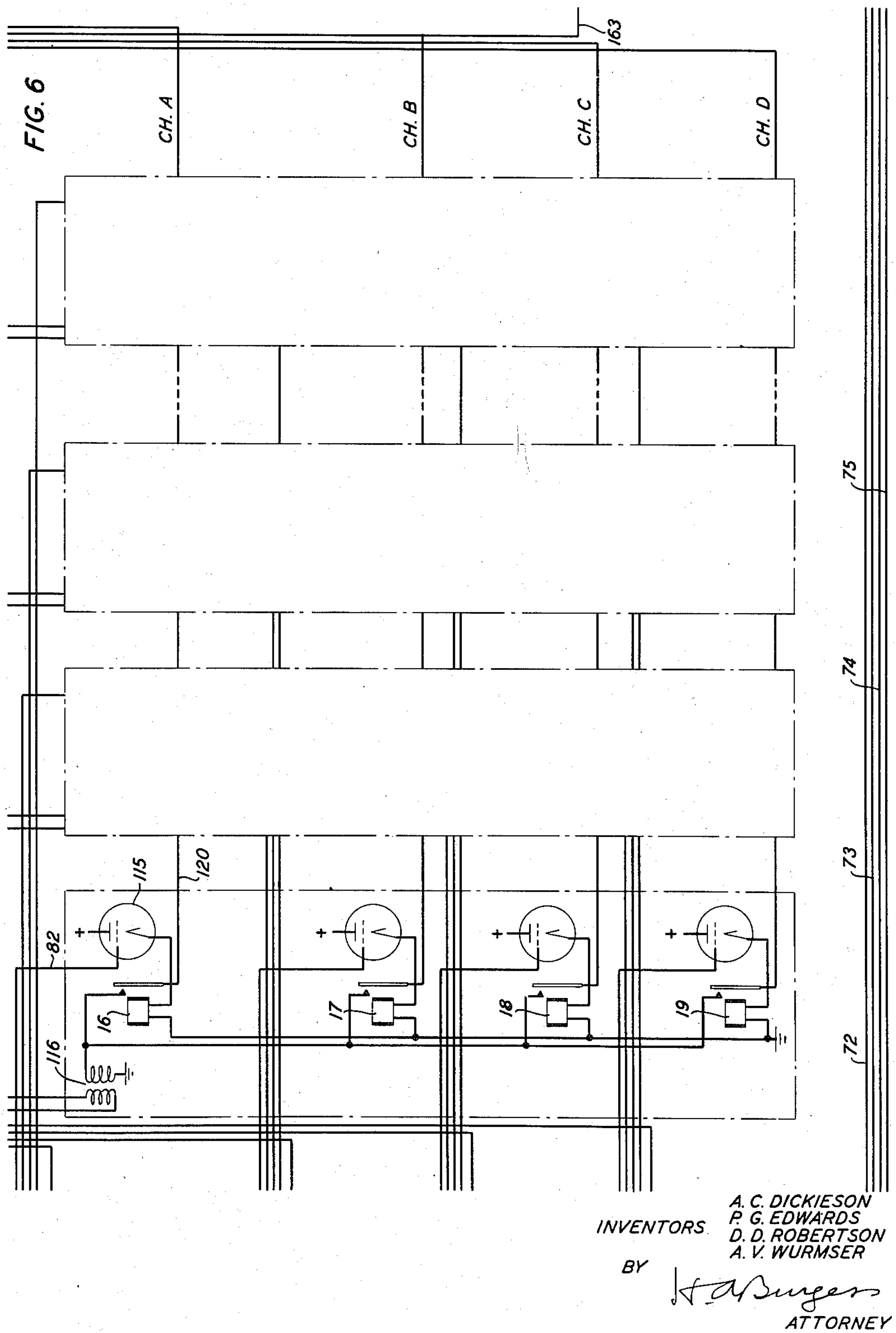

The use of tones to control connections at the receiver, disclosed herein, is claimed in an application by P. G. Edwards and A. V. Wurmser, Serial No. 201,632, filed December 19, 1950, which issued as Patent 2,651,678, dated September 8, 1953; the coordinate switching circuits used at the receiver and specifically disclosed herein and illustrated on Figs. 12 and 13 are claimed in an application of D. D. Robertson and A. V. Wurmser, Serial No. 201,631 filed December 19, 1950, which issued as Patent 2,629,021, dated February 17, 1953; and the coordinate switching circuits used at the transmitting terminal and specifically disclosed herein and illustrated in Figs. 4 and 6 are claimed in an application of D. D. Robertson, Serial No. 201,563, filed December 19, 1950, which issued as Patent 2,629,020, dated February 17, 1953.

The invention is not to be construed as limited to the details disclosed herein since these are illustrative and various modifications may be made within the spirit and scope of the invention.

What is claimed is:

1. In a system in which speech fragments from some talkers are sent over the same circuits that serve to transmit speech fragments of other talkers and in the same frequency range during pauses between speech fragments of such other talkers to utilize existing circuits to fuller capacity, means to subdivide said frequency range to provide a greater number of transmission bands of lowered quality, and means responsive to further speech fragments from one of said first mentioned talkers arriving at an instant when all of said circuits are already carrying speech fragments of other talkers at full band width, for operating said subdividing means to provide additional bands for the transmission of said further fragments.

2. In a telephone system, a first group of subscribers' lines, a second similar group of subscribers' lines at a distance from the grst group, a plurality of transmission links less in number than the lines in a group for use in common by all of said lines for transmitting speech from said first group to said second group of lines, means to subdivide the total frequency band width of each transmission link into fractional parts, each link providing one transmission channel using the total band width of the link or more than one transmission channel each using a fractional part of said total band width, voice-operated means connected with each subscriber's line of said first group responsive to a speech fragment on said line for routing said speech fragment over an available transmission channel and means controlled by a multiplicity of said voice-operated means for actuating said means to subdivide the total frequency band width of a transmission link into fractional parts only when the number of said voice-operated means that are simultaneously operated is greater than said plurality of transmission links.

3. In a telephone system, a group of incoming lines, outgoing trunks providing a total number of speech transmission channels less than the number of said lines, a voice-operated switching device connected to each line operating and releasing in response to short speech fragments of vocal interval duration, means operated from each device for random seizing of any one of said channels, not already in use, for the duration of such a speech fragment for routing the speech fragment from any one of said incoming lines into the seized channel, said last means simultaneously with the seizure of said available channel making the seized channel unavailable to other lines during the transmission of such speech fragment, means to vary the frequency band width of each of said channels, and means operated from said voice-operated switching means and dependent upon the number of such voice-operated switching means that are simultaneously operated for controlling said means to vary the frequency band width of said channels.

4. In a system of transmission of interpolated speech, a trunk circuit adapted to transmit a full width band of speech frequency currents, a plurality of incoming telephone lines, band splitting means including frequency-shifting means, a band determinator including selectively operated switching elements for controlling said band splitting means, and a voice-operated device associated with each of said telephone lines for controlling operation of said band determinator said band determinator comprising means responsive to the operation of a single one of said voice operated devices by a first speech wave arriving over a first telephone line for actuating said switching elements to establish a full speech band width connection between said trunk circuit and said associated telephone line, and means responsive to the operation of a second one of said voice operated devices by a second speech wave arriving over a second telephone line which is later in arriving than, but concurrently flowing with, said first speech wave for actuating said switching elements to insert said band splitting means and said frequency shifting means between said trunk circuit and said first and second telephone lines, whereby the full width speech frequency band transmission property of said trunk line is divided between the said first and said second telephone lines.

5. In a speech spurt telephone system, a plurality of speech originating lines, a toll circuit normally unconnected to said lines and having a transmission frequency range as great as a full speech frequency band, two filters for dividing said range into two halves, switch means for effectively inserting one or both of said filters in circuit between a line and said toll circuit, a voice-operated device individual to each line, means controlled by any of said voice-operated devices when such device is operated alone for actuating said switch means to include both of said filters between the line corresponding to such operated device and said toll circuit to permit transmission of speech from said last mentioned line to said toll circuit at full band, and means operated conjointly by the voice-operated devices of any two of said lines for actuating said switch means to include one of said two filters in circuit between one of said two lines and said toll circuit and to include the other of said two filters between the other of said two lines and said toll circuit.

6. A system according to claim 5 including means associated with one of said filters for raising the frequency of the speech band on one of said two lines to cause the lower half of such band to pass through the filter passing the upper half band.

7. In a telephone system, a pair of toll circuits each capable of transmitting frequencies of a full speech band width, filter means for subdividing the band width of each circuit into halves, filter means for dividing the band width of each circuit into one part equal to two-thirds of the speech band width and one part equal to one-third of the speech band width, at least four originating speech lines, a voice-operated device individual to each line, means actuated in dependence upon the number of said devices simultaneously operated for including different ones of said filters in circuit between said lines and said toll circuits to permit full band, two-thirds band or half band transmission of the speech from said originating lines over said toll circuits according as two, three or four of said lines are simultaneously carrying speech.

8. In a telephone system, a plurality of speech frequency toll circuits each having a frequency transmission range sufficient to accommodate a full speech band, a greater number of subscriber lines, a voice-operated device per subscriber line, switching means operating in response to actuation of any device for connecting the corresponding line to one of said toll circuits, filter means associated with each toll circuit for subdividing said range into fractional parts, band switching means for variously connecting said filter means into circuit between different subscriber lines and toll circuits to reduce the width of band utilized for transmission of any one subscriber's speech, and band selector means for controlling the operation of said band switching means in response to the simultaneous actuation of a multiplicity of said voice-operated devices, said band selector means controlling said band switching means for connecting said filter means between said toll circuits and said subscribers' lines for providing an increased number of channels with reduced band width only when the number of said devices simultaneously actuated is greater than the number of said toll circuits.

9. A system according to claim 8 in which said filter means and said band switching means include means for providing for either full band transmission or half band transmission depending upon the number of voice-operated devices simultaneously actuated.

10. A system according to claim 8 in which said filter means and said band switching means include means for providing for full band, two-thirds band or half band transmission depending upon the number of voice-operated devices simultaneously actuated in each case.

11. A system according to claim 8 including a receiving terminal for said toll circuits, subscriber lines thereat corresponding in number to the number of subscriber lines at the sending end of said toll circuits, subscriber line selecting means, filter means, band switching means and band selector means at said receiving terminal, and means controlled at said sending end of said toll circuits for coordinating the action of said subscriber line selecting means; said filter means, band switching means and band selector means with the action of the corresponding means at the sending station.

12. In a telephone system, a toll circuit having a band width capable of transmitting good quality speech, a subscriber's line for supplying a speech signal, voice-operated means connected to said subscriber's line for connecting said line to said toll circuit during the time said speech signal flows, a second subscriber's line for supplying a second speech signal, and a second voice-operated means, controlled by said second speech signal for subdividing said toll circuit into two narrower band channels during the time both speech signals are flowing, including means for shifting the connection between said first subscriber's line from said full toll circuit to one of said narrower band channels, and including means for connecting said second subscriber's line to said second narrower band channel.

13. A telephone system according to claim 1 in which said toll circuit is a speech frequency circuit and in which said second voice-operated means includes means for providing one narrower band channel by filtering means limiting transmission to a lower frequency part of said toll circuit band width, and includes means for providing the second narrower band channel for low speech frequencies in the upper frequency region of said toll circuit band by frequency shifting means.

14. In a speech spurt telephone system voice-operated means for directing speech spurts from different conversations over a single line, frequency limiting and frequency shifting circuits associated with said line for restricting the band width assigned to any speech spurt, and for shifting frequencies of a speech spurt from a second conversation to a portion of the transmission frequency range of said line denied to frequencies of said first speech spurt by said frequency limiting circuit, means operating under joint control of both of said speech spurts when flowing simultaneously for operating said frequency limiting and frequency shifting circuits for restricting the band width of the channels assigned to the two speech spurts to different fractional parts of said transmission frequency range of said line, and means operative when one of said simultaneous speech spurts ceases for increasing the transmission band width accessible to the remaining spurt to the full band width of said transmission range of said line.

15. In a telephone system, a group of incoming subscribers' lines, outgoing trunks providing a total frequency band width dividable into a variable number of speech transmission channels, voice-operated means connected with each subscriber's line for seizing any available channel and connecting it with one of said subscribers' lines over which a speech wave arrives, means jointly operated by said voice-operated means connected to a multiplicity of active subscribers' lines simultaneously supplying speech waves for dividing said total frequency band width of said trunks into a number of channels corresponding in number to the number of said active subscribers' line simultaneously supplying speech waves.

16. In a telephone system, a plurality $n$ of toll circuits adapted to carry a band of frequencies in the speech range, a greater number $m$ of subscribers' lines for supplying speech fragments to be transmitted, voice operated means connected to each of said subscribers' lines which operate and release in response to short speech fragments of vocal interval duration which arrive over their respective subscribers' lines, and selector means responsive to the operation of each of said voice operated means for selecting an idle toll circuit for connection to the subscriber's line associated with the voice operated means which is operated, said selector means comprising a bank of $nm$ gas discharge devices parallel connected in $n$ rows and $m$ columns and interclocked by rows and by columns.

17. A system according to claim 16 including voice-operated means for providing an additional communication channel comprising means for splitting the transmission band of said connected toll circuit into two portions providing two narrower toll channels, said means operating under control of an additional speech fragment on an additional subscriber's line, which fragment arrives later than but flows simultaneously with said first speech fragment.

18. A system according to claim 16 including a group of subscribers' lines at the receiving end of said plurality of toll circuits, voice-operated means at the transmitting end under control of said supplied speech fragment for transmitting over said toll circuits two control signals, one to identify the receiving subscriber's line to receive said speech fragment and the other to identify the toll circuit transmitting said speech fragment, and means at the receiving end of said toll circuits under control of said control signals for connecting said identified subscriber's line to said toll circuit.

19. In a telephone system, a plurality $n$ of toll circuits adapted to carry a band of frequencies in the speech range, a greater number $m$ of subscribers' lines for supplying speech fragments to be transmitted, voice operated means connected to each of said subscribers' lines which operate and release in response to short speech fragments of vocal interval duration which arrive over their respective subscribers' lines, selector means for each source line responsive to the operation of its associated wave operated means for selecting in a substantially random manner and on a substantially equal competitive basis with each other selector means one of the toll circuits which is idle, and means for connecting said associated source line to said selected toll circuit.

20. A system according to claim 19 including a group of receiving lines at the receiving end of said plurality of toll circuits, wave-operated means at the transmitting end under control of said signal wave for transmitting over said toll circuits two control signals, one to identify the receiving line to receive said wave and the other to identify the toll circuit transmitting said wave, and means at the receiving end of said toll circuits under control of said control signals for connecting the identified receiving line to said toll circuit.

21. In a telephone system, a first group of subscribers' lines, a second similar group of subscribers' lines at a distance from the first group, a plurality of transmission links less in number than the lines in one of said groups for use in common by all of said lines for transmitting speech from said first group to said second group of lines, means to subdivide the total frequency band width of each transmission link into fractional parts, each link providing one transmission channel using the total band width of the link or more than one transmission channel each using a fractional part of said total band width, individual voice-operated means connected with each of a plurality of said first subscribers' lines equal in number to the plurality of transmission links and responsive to speech waves on their associated said lines for connecting each of said lines to one of said transmission links when speech waves arrive simultaneously on each of said plurality of subscribers' lines, voice-operated means connected with an additional subscriber's line of the first group responsive to a simultaneous speech wave on said additional line for connecting said additional line with said subdividing means whereby said subdividing means reduces the band widths of the channels to which said plurality of subscribers' lines are connected and provides an additional channel for said additional speech wave within the original band widths of the said plurality of transmission links connected to said plurality of subscribers' lines.

22. In a telephone system, a plurality of toll circuits, a greater number of subscribers' lines, means for applying speech fragments of vocal interval duration from said subscribers' lines to said toll circuits comprising voice operated switching means which operate and release in response to speech fragments of vocal interval duration, toll circuit selector means associated with each of said voice operated switching means for selecting an idle toll circuit for an incoming speech fragment in response to the operation of its associated voice operated means by an applied speech fragment, said selector means each comprising a plurality of similar voltage responsive means, one for each toll circuit, means for applying speech fragments from the line associated with said selector means to said voltage responsive means in parallel, and means responsive to the operation of one of said voltage responsive means for locking out the other voltage responsive means of the same selector means.

23. The combination in accordance with claim 22 and means responsive to the operation of one of said voltage responsive means for locking out the voltage responsive means of each other selector means associated with the same toll circuit.

References Cited in the file of this patent

UNITED STATES PATENTS

| Number | Name | Date |
|---|---|---|
| 2,271,000 | Lovell | Jan. 27, 1942 |
| 2,388,001 | Loughren | Oct. 30, 1945 |